United States Patent [19]

Tazewell et al.

[11] Patent Number: 4,843,138
[45] Date of Patent: Jun. 27, 1989

[54] POLYUREAURETHANES HAVING IMPROVED LOW TEMPERATURE PROPERTIES BASED ON HIGH MOLECULAR WEIGHT POLYETHER INTERMEDIATES

[75] Inventors: Joseph H. Tazewell, Akron, Ohio; Christopher P. Christenson, Lake Jackson, Tex.; Robert B. Turner, Lake Jackson, Tex.; Manuel Gonzales, Jr., Lake Jackson, Tex.

[73] Assignees: The Firestone Tire & Rubber Company, Akron, Ohio; The Dows Chemical Company, Midland, Mich.

[21] Appl. No.: 153,054

[22] Filed: Feb. 8, 1988

[51] Int. Cl.⁴ .............................................. C08G 18/00
[52] U.S. Cl. .................................................. 528/52
[58] Field of Search ......................................... 528/52

[56] References Cited

U.S. PATENT DOCUMENTS

| | | | |
|---|---|---|---|
| 3,755,261 | 8/1973 | VanGulick | 260/77.5 |
| 4,330,454 | 5/1982 | Kimball | 260/77.5 |
| 4,463,155 | 7/1984 | Kibler | 528/60 |
| 4,517,331 | 5/1985 | Parker et al. | 524/451 |

*Primary Examiner*—Maurice J. Welsh
*Attorney, Agent, or Firm*—Renner, Kenner, Greive, Bobak, Taylor & Weber

[57] ABSTRACT

Improved low temperature properties of polyureaurethane are obtained, such as low glass transition temperatures and reduced bending moduli at $-400°$ C., by the use of relatively high moleuclar weight polyether polyol intermediates. The polyureaurethane is made by reacting the polyether polyol intermediate with a diisocyanate and subsequent cure with a metal halide salt complex of methylenedianiline.

19 Claims, No Drawings

4,843,138

POLYUREAURETHANES HAVING IMPROVED LOW TEMPERATURE PROPERTIES BASED ON HIGH MOLECULAR WEIGHT POLYETHER INTERMEDIATES

FIELD OF THE INVENTION

The present invention relates to polyureaurethanes made from polyethers and cured with a metal salt complex of methyhlenedianiline (MDA) which have reduced glass transition temperatures (Tg) and reduced low temperature bending moduli with essential retention of other desirable properties.

BACKGROUND ART

Heretofore, it has been common knowledge that polyureaurethanes made from polypropylene oxide have poor low temperature properties when compared to similar polyureaurethanes made from polytetramethylene ether glycol.

U.S. Pat. No. 3,755,261 to VanGulic relates to the use of metal halide salt complexes of methylenedianiline in the cure of urethane polymers.

U.S. Pat. No. 4,330,454 to Kimball relates to a urethane composition having a prolonged storable flowable shelf life at room temperature. A prepolymer is made by reacting polyproylene ether glycol with an organic polyisocyanate. The prepolymer is mixed with a metal halide complex of methylenedianiline curative to form a composition with extended shelf life, which can be subsequently cured by appropriate heating.

U.S. Pat. No. 4,463,155 to Kibler relates to a polyureaurethane derived from the cure of a polyether diisocyanate utilizing a metal halide salt complex of methylenedianiline and a polyether diol, such as polytetramethylene ether glycol.

U.S. Pat. No. 4,517,331 to Parker relates to a storable polypropylene ether polyurethane precurser composition made from a prepolymer of a polypropylene ether glycol and an organic polyisocyanate which is cured with metal halide salt complex of methylenedianiline in association with a crown or pseudocrown ether catalyst.

The above patents do not teach improved low temperature properties of the resultant polyureaurethanes as a consequence of utilizing relatively high molecular weight polyether intermediates.

SUMMARY OF THE INVENTION

It is therefore an aspect of the present invention to provide a polyureaurethane having improved low temperature properties. Low temperature properties dictate the lowest ambient temperature at which an elastomer is useful without embrittlement or failure in flexure. The present invention allows the formulation of polyureaurethane elastomers with improved temperature use capability by varying the molecular weight of the polyether polyol intermediate. Generally, in the compositions of the present invention, the higher the temperature at which the urethane polymer can be utilized. While generally retaining favorable properties, the polyureaurethanes of the present invention have reduced bending modulus, and low glass transition temperatures such as below −20° C., desirably −30° C., and preferably below −40° C. These and other aspects of the present invention will become apparent from the following detailed specification.

DETAILED DESCRIPTION OF THE INVENTION

The high molecular weight polyether intermediates of the present invention are generally polyethers, that is poly(oxyalkylene) polyols and hence are made from various cyclic oxirane monomers containing two or more carbon atoms with polyhydric alcohol initiators having from 2 to about 6 carbon atoms or water. The preparation of such compounds are well known to the art as well as to the literature and, hence, will not be discussed in detail. The end result is a hydroxyl terminated poly(oxyalkylene) polyol. The poly(oxyalkylene) groups are generally derived from an oxirane or alkyl (1 to 4 carbon atoms) substituted oxiranes and contain a total of from 2 to about 6 carbon atoms therein. Examples of suitable oxiranes include ethylene oxide, propylene oxide, butylene oxide, and the like. When reacted, the hydroxyl terminated poly(oxyalkylene) polyols, hereinafter referred to as polyether intermediates, have an oxirane or an alkyl substituted oxyethylene repeating unit therein with the alkyl group having from 1 to 4 carbon atoms. A polyether diol and the polyether triol are desired and can be utilized as blends, as for example from about 1 percent by weight to about 99 percent by weight of the diol bzsed upon a total weight of the polyether diol and the polyether triol. In the present invention, a hydroxyl terminated poly(oxypropylene) diol or triol, or combinations thereof, are preferred. The present invention thus generally relates to polyether chains which contain alkyl substituents thereon. It is to be understood that other than a polyoxyethylene polyol, the polyether intermediates of the present invention contain alkyl substituents thereon. Hence, polyether intermediates such as polyoxytetramethylene polyol which do not contain any alkyl substituents thereon are not utilized and are not within the scope of the present invention.

The various polyether intermediates of the present invention with the exception of poly(oxyethylene) diol or triol can contain ethylene oxide repeating units therein. That is, inasmuch as poly(oxyethylene) diol or triol contains ethylene oxide repeating units, there is no need to add ethylene oxide repeating units thereto. One suitable method of adding ethylene oxide to the polyether intermediates is to end cap the same. That is, block copolymers are formed with at least one ethylene oxide block on many or a predominate number of the polyether intermediate chain ends. A substantial number of the various intermediates have an average of at least 1 to about 20 ethylene oxide units on the chain end and preferably from about 4 to about 10 units. That is, of the larger number of individual intermediate molecules prepared, the ethylene oxide end caps, on the average, will have at least 1 to a maximum of approximately 20 repeating ethylene oxide units therein.

Another type of ethylene oxide containing polyether intermediate is essentially a random copolymer made by adding the monomers forming the polyether intermediate such as propylene oxide and the ethylene oxide together and causing a reaction to proceed. A third type of ethylene oxide containing polyether intermediate is made by alternating the feed of polyether intermediate monomers and ethylene oxide and reacting the same until a desired copolymer is produced. In effect, a multiple mini block copolymer is produced.

Regardless of whether an essentially random copolymer, a multiple mini block copolymer, or a block copolymer is utilized, the amount of ethylene oxide contained therein is from about 2 percent to about 60 percent by weight, desirably from about 8 percent to about 25 percent by weight, and preferably from about 12 percent to about 20 percent by weight. Such compounds are known to the art as well as to the literature. For example, preparation of such compounds generally proceed via anionic polymerization and, hence, utilize a basic catalyst such as potassium hydroxide, and the like. Examples of specific ethylene oxide containing polyethers include the various Voranols such as Voranol 4702, Voranol 4701, Voranol 4815, Voranol 5148, Voranol 5287 and Voranol 3137, all produced by The Dow Chemical Company. Voranol is a trademark of the Dow Chemical Company. Ethylene oxide containing polyether intermediates are utilized where increased reactivity with metal halide salt complexes of methylenedianiline is desired was when the diisocyanate is 4,4'-diphenylmethane diisocyanate.

The polyether intermediates which do not contain any ethylene oxide end blocks, etc. are also made in a conventional manner as known to the art. Whether or not the high molecular weight polyether intermediate contains ethylene oxide groups therein or thereon, the number average molecular weight of the polyether diol intermediate is from about 200 to about 9,000, desirably from about 500 to about 8,000, more desirably from about 1,000 to about 8,000 and oftentimes in excess of 4,000. The number average molecular weight of the polyether triol intermediate is generally from about 2,000 to about 10,000, desirably from about 3,000 to about 10,000, and more desirably from about 4,000 to about 7,500 and oftentimes in excess of 7,000.

The high molecular weight polyether intermediates of the present invention are reacted with a conventional polyisocyanate to form the prepolymer. Suitable polyisocyanates include those having the formula $R-(N=C=O)_n$ where n is from about 2 to about 4, preferably about 2, where R is an aliphatic or desirably an alkyl containing from about 2 to about 20 carbon atoms, preferably from 2 to about 10 carbon atoms, or a cycloaliphatic containing from about 5 to about 20 carbon atoms and desirably a cycloalkyl containing from 5 to about 12 carbon atoms, or an aromatic or an alkyl substituted aromatic containing from 6 to about 10 carbon atoms, and preferably from 6 to about 14 carbon atoms. Desirably R is an aromatic or an alkyl substituted aromatic. Examples of suitable polyisocyanates include the various 4,4'-diphenyl diisocyanates, para-phenylene diisocyanate, the various toluene diisocyanates (TDI), the various bitolylene diisocyanates, the various naphthylene diisocyanates such as 1,5-naphthylene diisocyanate and 2,6-naphthylene diisocyanate; and MDI, that is 4,4'-diphenylmethane diisocyanate. MDI and TDI are preferred.

Inasmuch as prepolymers are desired containing essentially $N=C=O$ end groups thereon, an excess of the polyisocyanate is utilized. Desirably, an amount of polyisocyanate is utilized such that from about 2 to about 10 weight percent and desirably from about 3 to about 8 weight percent of free isocyanate is present based upon the weight of the prepolymer. The reaction conditions between the polyisocyanate and the polyether intermediate are generally known to those skilled in the art and to the literature. An exemplary temperature range is from about ambient to about 100° C., desirably from about 40° C. to about 90° C., and preferably from about 60° C. to about 80° C. At low temperatures, the reaction becomes slow. High temperatures are generally avoided since undesirable side reactions are initiated. The reaction moreover can be generally carried out at atmospheric pressure or under slight pressure, usually in the presence of a dry inert gas such as nitrogen.

The prepolymers of the present invention are cured with a metal halide salt complex of MDA, that is 4,4'-methylenedianiline. Various salts can be utilized with MDA such as sodium chloride, sodium bromide, sodium iodide, sodium nitrite, lithium chloride, lithium bromide, lithium iodide, lithium nitrite, and sodium cyanide with sodium chloride being preferred. A description of MDA and the various salt complexes thereof which can be utilized in the present invention are set forth in U.S. Pat. No. 3,755,261 to Van Gulick which is hereby fully incorporated by reference. Cure of the prepolymer generally takes place at a temperature of from about 100° C. to about 150° C., and preferably from about 130° C. to about 140° C. under anhydrous conditions. The equivalent ratio of the MDA curing agent to the polyisocyanate is conventional as from about 0.80 to about 1.15, desirably from about 0.90 to about 1.1, and preferably from about 0.95 to about 1.05.

The cured polyureaurethanes of the present invention have good low temperature properties. For example, the glass transition temperature of the polyurethane were unexpected. Another unexpected property is the improvement in the bending modulia at −40° C. That is, the bending moduli of compositions of the present invention are generally reduced as the molecular weight of the polyether intermediate is increased. Generally, the bending moduli at −40° C. is 40,000 psi or less, desirably 30,000 psi or less, and preferably 20,000 psi or less. Accordingly, polyureaurethanes having a particular tailor-made low temperature end use point can be readily formulated.

The invention will be better understood by reference to the following examples.

EXAMPLE 1

Preparation of EO Block Triol/MDI Prepolymer

Into a 5,000 ml three-necked, round bottom flask, equipped with stirrer, pressure equilibrating dropping funnel, thermometer, nitrogen bubbler and heating mantle, was weighted 1070.8 g of molten 4,4'-diphenylmethane diisocyanate (MDI) (Isonate 125M, product of The Dow Chemical Co.) and maintained at a temperature of 70° C. While maintaining a blanket of dry nitrogen in the reaction vessel, 3,200 g of 5,000MW ethylene oxide end blocked polypropylene oxide triol (Voranol 4702), a product of The Dow Chemical Company (34.3 hydroxyl number) was added dropwise to the stirred MDI, at a rate so as not to exceed 75° C. The reaction mixture was stirred and maintained at 70° C. for two hours after all of the polyol had been added. The prepolymer was then held under about 1.0 mm Hg pressure, with stirring, for two additional hours. The resultant prepolymer had a free isocyanate content of 5.93 percent.

Cure of EO Block Triol/MDI/Caytur-21

Into a dry 500 ml, three-necked, round bottom flask, equipped with stirrer, thermometer, heating mantle, nitrogen bubbler and vacuum, was weighted 147.7 g of the above EO block triol/MDI prepolymer (5.93 percent NCO). To the homogeneously mixed and stirred prepolymer, under a dry nitrogen blanket, was added from a tared syringe 44.7 g of a 50/50 dispersion of methylenedianiline-sodium chloride complex (3MDA-NaCl) in dioctylphthalate carrier (Caytur-21, product of E.I. duPont de Nemours) and 7.1 g additional of dioctylphthalate. A vacuum of about 1.0 mm Hg was gradually applied and the mixture temperature was raised to 40° C., over a period of 20 minutes. Vacuum was broken with nitrogen and the mixture was cast into a mold, preheated at 135° C., and then cured in a hydraulic laboratory press at 135° C. for 60 minutes.

The result polyureaurethane had the following properties:

TABLE I

| Room Temperature | | Crescent Tear | |
|---|---|---|---|
| Shore "A" | 93 | R.T., pli | 382 |
| RT Tensile, psi | 2,192 | 100° C., pli | 311 |
| % Elong., | 264 | Bending Modulus @ | −40° C., |
| 5% Modulus, psi 100° C. | 520 | 30,683 psi | |
| Tensile, psi | 1,708 | | |
| Elong., % | 199 | | |
| 5% Modulus, psi | 445 | | |

Utilizing an analogous recipe and procedure as set forth above, similar elastomers based on Voranol 2012, a 1,200 mw polypropylene oxide diol, had bending moduli in excess of 40,000 psi at −40° C. Thus, the high molecular weight polyether intermediate of the present invention resulted in reducing the bending modulus in half. Further, blends of 5,000 mw triol and 1,200 mw diol MDI prepolymers when cured with Caytur-21, as described above, gave elastomers with the Tg's and −40° C. bending moduli properties set forth in Table II.

TABLE II

EFFECT OF COMPOSITION ON −40° C. BENDING MODULUS BLENDS OF PPO-MDO PREPOLYMERS CURED WITH CAYTUR-21

Triol Prepolymer - (5,000 MW, EO-capped, PPO-triol)MDI, 6.55% NCO
Diol Prepolymer - (1,200 MW, PPO-diol)MDI, 6.88% NCO
Curative - Caytur-21
Stoichiometry - $NH_2/NCO = 1.0$

| Weight % Triol Prepolymer | Weight % Diol Prepolymer | Tg, °C. | −40° C. YBM, psi |
|---|---|---|---|
| 100 | 0 | −67.1 | 30,683 |
| 75 | 25 | — | 27,193 |
| 50 | 50 | — | 40,911 |
| 25 | 75 | — | 61,366 |
| 0 | 100 | −35.0 | 93,214 |

EXAMPLE 2

In a manner similar to Example 1, the following polyureaurethanes were made and tested with regard to the Tg of the soft segment.

TABLE III

| Soft Segment Glass Transition Temperature | | |
|---|---|---|
| Polyol Used in Prepolymer | | Tg of Soft Segment |
| VORANOL* 2120 | (2000 MW) | −35° C. |
| VORANOL* 4701 | (4800 MW) | −45° C. |
| VORANOL* 4815 | (6000 MW) | −55° C. |
| VORANOL* 5148 | (7200 MW) | −60° C. |

*Manufactured by The Dow Chemical Company.

By the term "soft segment," it is meant the polyether intermediate portion of the polyureaurethane of the present invention. As apparent from Table I, the Tg of the soft segment was reduced as the molecular weight of the intermediate increased.

While in accordance with the Patent Statutes, a best mode and preferred embodiment have been set forth, the scope of the invention is not limited thereto, but rather by the scope of the attached claims.

We claim:

1. A low glass transition temperature polyureaurethane comprising:

a polyureaurethane made from (a) a poly(oxypropylene)-based polyol intermediate having a molecular weight of at least about 3,000 and alkyl substituted oxyethylene or oxyethylene repeating units therein, the majority of said polyol being triol, (b) a polyisocyanate, and (c) a metal halide salt complex of methylenedianiline, the molecular weight of said polyether intermediate being an effective molecular weight so that said polyureaurethane has a glass transition temperature of −20° C. or lower.

2. A low glass transition temperature polyureaurethane according to claim 1, wherein said poly(oxypropylene)-based polyol intermediate contains some diol having a molecular weight of from about 2000 to about 9,000, and said triol intermediate has a molecular weight of up to about 10,000.

3. A low glass transition temperature polyureaurethane according to claim 2, wherein said alkyl substituent of said oxyethylene repeating unit contains from 1 to 4 carbon atoms.

4. A low glass transition temperature polyureaurethane according to claim 3, wherein said polyisocyanate has the formula $(R-(N=C=O)_n$ wherein n is from about 2 to about 4, and wherein R is an aliphatic group having from 2 to about 20 carbon atoms, a cycloaliphatic group having from about 5 to about 20 carbon atoms, an aromatic or an alkyl substituted aromatic group having from 6 to about 20 carbon atoms, and wherein said glass transition temperature is −30° C. or lower.

5. A low glass transition temperature polyureaurethane according to claim 4, wherein said polyisocyanate is diphenyl diisocyanate, phenylene diisocyanate, bitolylene diisocyanate, naphthalene diisocyanate, diphenylmethane diisocyanate, or toluene diisocyanate, wherein the molecular weight of said diol intermediate is up to about 8,000.

6. A low glass transition temperature polyureaurethane according to claim 5, wherein said metal halide salt of said methylenedianiline salt complex is sodium chloride.

7. A low glass transition temperature polyureaurethane according to claim 6, wherein said polyisocyanate is toluene diisocyanate or diphenylmethane diisocyanate, and wherein said poly(oxypropylene)-based polyol intermediate comprises poly(oxypropylene) diol and poly(oxypropylene) triol.

8. A low glass transition temperature polyureaurethane according to claim 7, wherein said diol intermediate has a molecular weight of greater than 7,000, wherein said triol intermediate has a molecular weight greater than 4,000, and wherein said glass transition temperature is −40° C. or lower.

9. A low glass transition temperature polyureaurethane according to claim 1, wherein said poly(oxypropylene)-based polyol intermediate having alkyl substituted oxyethylene repeating units therein contains ethylene oxide repeating units therein, and wherein said ethylene oxide is said intermediate exists substantially as end blocks on said poly(oxypropylene)-based polyol intermediate.

10. A low glass transition temperature polyureaurethane according to claim 7, wherein said poly(oxypropylene)-based polyol intermediate having alkyl substituted oxyethylene repeating units therein contains ethylene oxide repeating units therein, and wherein said ethylene oxide in said intermediate exits substantially as end blocks on said poly(oxypropylene)-based polyol intermediate, and wherein the average number of said ethylene oxide units in each said end block is from about 1 to about 20.

11. A polyureaurethane having a low bending modulus at a low temperature, comprising:
a polyureaurethane made from (a) a poly(oxypropylene)-based polyol intermediate having a molecular weight of at least about 3,000 and alkyl substituted oxyethylene or oxyethylene repeating units therein, the majority of said polyol being triol, (b) a polyisocyanate, and (c) a metal halide salt complex of methylenedianiline, the molecular weight of said polyether intermediate being an effective molecular weight so that said polyureaurethane has a bending moduli at −40° C. or 40,000 psi or less.

12. A polyureaurethane according to claim 11 wherein said alkyl substituent of said oxyethylene repeating unit contains from 1 to 4 carbon atoms.

13. A polyureaurethane according to claim 12, wherein said poly(oxypropylene)-based polyol intermediate contains some diol having a molecular weight of from about 2000 to about 9,000, and said triol intermediate has a molecular weight of up to about 10,000, and wherein said polyisocyanate has the formula R—(N=C=O)$_n$ wherein n is from about 2 to about 4, and wherein R is an aliphatic group having from about 2 to about 20 carbon atoms, a cycloaliphatic group having from 5 to about 20 carbon atoms, an aromatic or an alkyl substituted aromatic group having from 6 to about 20 carbon atoms.

14. A polyureaurethane according to claim 13, wherein said bending moduli is 30,000 psi or less at −40° C.

15. A polyureaurethane according to claim 14, wherein said polyisocyanate is diphenyl diisocyanate, phenylene diisocyanate, bitolylene diisocyanate, naphthalene diisocyanate, diphenylmethane diisocyanate, or toluene diisocyanate, wherein the molecular weight of said diol intermediate is up to about 8,000.

16. A polyureaurethane according to claim 15, wherein said metal halide salt of said methylenedianiline salt complex is sodium chloride, and wherein said bending moduli is 20,000 psi or less at −40° C., and wherein said polyether polyol intermediate is poly(oxypropylene) diol, or poly(oxypropylene) triol, or combinations thereof.

17. A polyureaurethane according to claim 11, wherein said poly(oxypropylene)-based polyol intermediate having alkyl substituted oxyethylene repeating units therein contains ethylene oxide repeating units therein, and wherein said ethylene oxide in said intermediate exists substantially as end blocks on said poly(oxypropylene)-based polyol intermediate.

18. A polyureaurethane according to claim 14, wherein said poly(oxypropylene)-based polyol having alkyl substituted oxyethylene repeating units therein contains ehtylene oxide repeating units therein, wherein said ethylene oxide contains in said intermediate exists substantially as end blocks on said poly(oxypropylene)-based intermediate polyol, and wherein the average number of ethylene oxide units in each said end block is from about 4 to about 10.

19. A polyureaurethane according to claim 15, wherein said poly(oxypropylene)-based polyol intermediate having alkyl substituted oxyethylene repeating units therein contains ethylene oxide repeating units therein, wherein said intermediate is a multiple block copolymer of said ethyleneoxide and said poly(oxypropylene)-based polyol or a random copolymer of said ethylene oxide and said poly(oxypropylene)-based polyol and contains from about 8 percent to about 25 percent by weight of ethylene oxide groups therein.

* * * * *